United States Patent Office 2,790,823
Patented Apr. 30, 1957

2,790,823

ACRYLIC ACID ESTERS CONTAINING A PHOSPHONAMIDO GROUP

Harry W. Coover, Jr., and Newton H. Shearer, Jr., Kingsport, Tenn., assignors to Eastman Kodak Company, Rochester, N. Y., a corporation of New Jersey No Drawing. Application April 30, 1954,
Serial No. 426,904

6 Claims. (Cl. 260—482)

This invention relates to alpha- and beta-diamidophosphono acrylates, to polymers thereof, and to a process for their preparation.

The compounds of the invention are represented by the following general structural formulas:

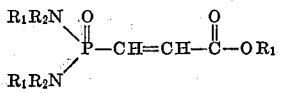

and

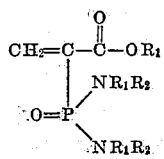

wherein $R_1$ represents an alkyl group of from 1 to 4 carbon atoms e. g. methyl, ethyl, propyl, isopropyl, butyl, sec. butyl, etc. groups and $R_2$ represents an atom of hydrogen or an alkyl group of from 1 to 4 carbon atoms. The new compounds of the invention above described are valuable intermediates for the preparation of other useful compounds, especially as they are readily homopolymerized and copolymerized to resinous products which are characterized by a high degree of flame resistance and good solubility in common volatile solvents. Such resinous products can also be molded or extruded or coated from their solutions to give stable shaped objects, fibers, tough films, and the like.

It is, accordingly, an object of the invention to provide a new class of phosphorus-containing unsaturated monomers. Another object is to provide resinous polymers of the same. Another object is to provide a process for preparing the new compounds. Other objects will become apparent hereinafter.

In accordance with our invention, we prepare the beta-diamidophosphono acrylate compounds defined above by reacting an alkyl α-haloacrylate, e. g. an alkyl α-bromoacrylate, with an alkyl ester of dialkyl- or tetraalkyl-diamido phosphorous acid (diamidophosphites), preferably in the presence of a polymerization inhibitor such as hydroquinone. The reaction may be represented by the following general equation:

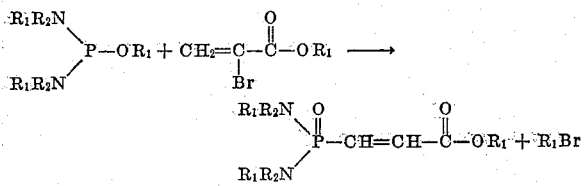

wherein $R_1$ and $R_2$ are as above defined. The temperature of the reaction can be varied from about 80° to 120° C., but preferably from 90° to 100° C. The proportions of reactants can vary widely, but preferably equimolar proportions are employed.

To prepare the alpha-diamidophosphono acrylate compounds of our invention, we react an ester of a β-acetoxy-α-halogen propionic acid with a similar diamidophosphite as above, preferably in the presence of a polymerization inhibitor such as hydroquinone. The reaction may be represented by the following general equation:

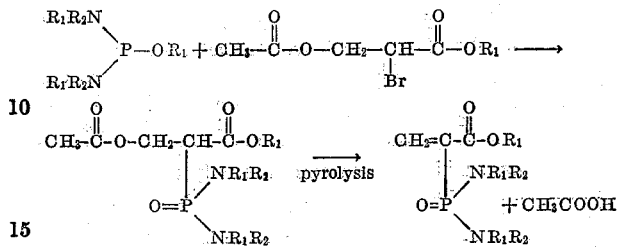

wherein $R_1$ and $R_2$ are as above defined. The temperature of addition step can vary from about 80° to 120° C., but preferably from 90° to 100° C. The proportions of reactants can vary widely, but preferably equimolar proportions are employed. The products obtained by the above described processes can be isolated by the usual methods of separation such as extraction, evaporation, etc., but preferably by distillation of the reaction mixtures under reduced pressures. Suitable intermediate diamidophosphites include the methyl-, ethyl-, propyl- and butyl-N,N'-dimethyl diamidophosphites, the methyl-, ethyl-, propyl- and butyl-N,N'-diethyl diamidophosphites, the methyl-, ethyl-, propyl- and butyl-N,N, N',N'-tetramethyl diamidophosphites, the methyl-, ethyl-, propyl- and butyl-N,N,N',N'-tetraethyl diamidophosphites, the methyl-, ethyl-, propyl- and butyl-N-methyl-N'-ethyl diamidophosphites, etc. These intermediates can be prepared as described by Kosolapoff, "Organo-Phosphorus Compounds," chapter 10, John Wiley & Sons, Inc., New York (1950). Suitable alkyl α-haloacrylates include methyl α-chloroacrylate, ethyl α-chloroacrylate, propyl α-chloroacrylate, isopropyl α-chloroacrylate, butyl α-chloroacrylate, methyl α-bromoacrylate, ethyl α-bromoacrylate, propyl α-bromoacrylate, isopropyl α-bromoacrylate, butyl α-bromoacrylate, etc. Suitable β-acetoxy-α-halogen propionic acid esters include methyl-β-acetoxy-α-chloropropionate, ethyl-β-acetoxy-α-chloropropionate, butyl-β-acetoxy-α-bromopropionate, ethyl - β-acetoxy-α-bromopropionate, propyl-β-acetoxy-α-bromopropionate, butyl-β-acetoxy-α-bromopropionate, and the like.

The polymerizations of the new compounds of the invention alone or conjointly with one or more other monoethylenically unsaturated, polymerizable organic compounds is accelerated by heat, by actinic light and by polymerization catalysts which are known to promote the polymerization of vinyl and other unsaturated organic compounds such as acetyl peroxide, tertiary butyl hydroperoxide, hydrogen peroxide, persulfates such as ammonium persulfate, sodium persulfate, potassium persulfate, persulfuric acid, etc., perborates such as sodium perborate and other alkali-metal perborates, the water-soluble salts of percarbonic acid, the water-soluble salts of perphosphoric acid, etc. The organic peroxides are especially suitable. Mixtures of catalysts can be employed. An activating agent such as sodium bisulfite can be used, if desired, in conjunction with the polymerization catalysts.

The polymerizations can be carried out in mass or dispersed in a nonsolvent for the monomers, the particles of dispersed monomer being very small (emulsion) or relatively large (bead or granular). For emulsion polymerization, any nonsolvent for the monomers can be employed, water being especially advantageous. The monomer or mixture of monomers can be advantageously emulsified in the water using emulsifying agents such as salts of higher fatty acids (e. g., sodium or potassium stearate, palmitate, etc.), ordinary soaps, salts of higher fatty alcohol sulfates (e. g., sodium or potassium cetyl sulfate, sodium or potassium lauryl sulfate, sodium or potassium stearyl sulfate, etc.) salts of aromatic sulfonic acids (e. g. sodium or potassium salts of alkylnaphthalene sulfonic acids, etc.) and higher molecular weight quaternary ammonium salts (e. g., dimethylbenzylphenyl ammonium chloride, etc.). For bead or granular polymerization relatively poor dispersing agents such as starch, methylated starch, gum arabic, polyvinyl alcohol, partly hydrolyzed polyvinyl acetate, gelatin sodium glycolate and finely divided magnesium carbonate, etc., can be employed. Mixtures of dispersing agents can be used. In the polymerizations wherein the monomers are dispersed in nonsolvents, the dispersions can be facilitated by stirring, shaking or tumbling the polymerization mixtures. Continuous methods of polymerization can also be employed.

The new monomers of the invention readily copolymerize with each other in any proportions or with one or more other polymerizable unsaturated compounds containing the basic vinyl group $CH_2=CH$ to give high molecular weight resinous polymers, for example, any of the new compounds with vinyl esters of carboxylic acids (e. g., vinyl acetate, vinyl butyrate, vinyl stearate, vinyl trifluoroacetate, vinyl benzoate, etc.), vinyl alkyl ketones (e. g., methyl vinyl ketone, ethyl vinyl ketone, trifluoromethyl vinyl ketone, etc.), vinyl alkyl ethers (e. g., methyl vinyl ether, butyl vinyl ether, etc.), vinyl sulfonamides (e. g., vinyl sulfonamide, N-methyl vinyl sulfonamide, etc.), vinyl halides (e. g., vinyl chloride, vinyl bromide, and vinyl fluoride), vinyl alkyl sulfones (e. g., vinyl methyl sulfone, vinyl ethyl sulfone, etc.), vinyl urethanes (e. g., vinyl methyl urethane, vinyl ethyl urethane, etc.), cyclic vinyl imides (e. g., vinyl succinimide, vinyl phthalimide, etc.), acrylic acid and its anhydride, amide, N-alkyl amide, nitrile, and the methyl, ethyl, butyl, benzyl and phenyl esters, butadiene, etc.). Other unsaturated compounds which can be copolymerized with our new monomers include methacrylic acid and its anhydride, amide, N-alkyl amides, nitrile, and the methyl, ethyl, butyl, benzyl and phenyl esters, vinylidene dichloride, vinylidene chloride-fluoride, alkyl esters of maleic and fumaric acids such as methyl maleate, methyl fumarate, fumaronitrile, cis- and trans-β-cyano and carboxamide-methyl acrylate, and the like. The polymers and copolymers of the invention are soluble in one or more volatile solvents such as acetone, methyl ethyl ketone, acetonitrile, dimethyl formamide, dimethylacetamide, etc.

The copolymers of the invention can contain variable amounts of each comonomer and are obtained with starting polymerization mixtures containing from 5% to 95% by weight of the new unsaturates and from 95% to 5% by weight of the above mentioned other unsaturated organic compounds. The copolymers have been found to contain substantially the same proportion of substituents as employed in the polymerization mixtures. The temperature of the polymerizations can be varied widely. Where a polymerization activating agent is employed, the polymerization will take place at a temperature as low as 0° C. However, the preferred temperature range for the polymerizations is from 25° C. to 130° C. Where the polymerization is carried out in an inert solvent or in suspension in a nonsolvent, the monomers advantageously constitute from 5% to 50% by weight of the mixture.

The following examples will serve to illustrate further our new unsaturated compounds, polymers thereof, and the manner of preparing the same.

*Example 1*

A solution of 16.4 g. of ethyl-N,N,N',N'-tetramethyl diamidophosphite, 16.5 g. of methyl-α-bromoacrylate and 0.1 g. of hydroquinone was heated at 90° to 110° C., until an equivalent quantity of ethyl bromide (0.1 mole) was evolved. The product which remained in the flask was methyl-β-N,N,N',N'-tetramethyl diamidophosphono acrylate. This product was purified by distillation under reduced pressure, B. P. 109°–112° C./0.5 mm. pressure.

*Example 2*

The procedure of Example 1 was followed using a solution of 19.2 g. of ethyl-N,N-diethyl-N',N'-dimethyl diamidophosphite, 16.5 g. of methyl-α-bromo acrylate and 0.1 g. of hydroquinone. The product which was separated by distillation of the reaction mixture was methyl-β-N,N-diethyl-N',N'-dimethyl diamidophosphono acrylate, B. P. 131° to 134° C./0.5 mm. pressure.

*Example 3*

The procedure of Example 1 was followed using a solution of 22 g. of ethyl-N,N,N',N'-tetraethyl diamidophosphite, 16.5 g. of methyl-α-bromo acrylate and 0.1 g. of hydroquinone. The product which was separated by distillation of the reaction mixture was methyl-β-N,N,N',N'-tetraethyl diamidophosphono acrylate, B. P. 152° to 155° C./0.5 mm. pressure.

*Example 4*

The procedure of Example 1 was followed using a solution of 13.6 g. of ethyl-N,N'-dimethyl diamidophosphite, 16.5 g. of ethyl-α-bromo acrylate and 0.1 g. of hydroquinone. The product which was separated by distillation of the reaction mixture was ethyl-β-N,N'-dimethyl diamidophosphono acrylate, B. P. 170° to 173° C./0.5 mm. pressure.

*Example 5*

A solution of 16.4 g. of ethyl-N,N,N',N'-tetramethyl diamidophosphite, 22.5 g. of methyl-β-acetoxy-α-bromopropionate and 0.1 g. of hydroquinone was heated at 90° to 100° C. until an equivalent of ethyl bromide (0.1 mole) was evolved. The product remaining in the flask was methyl-β-acetoxy-α-tetramethyl diamidophosphono propionate. To this material, there was added 0.6 g. of potassium bisulfite and 0.1 g. of hydroquinone. Upon heating the mixture above 200° C. acetic acid was pyrolyzed from the mixture. Potassium carbonate was added to neutralize the catalyst. The product, methyl-α-N,N,N',N'-tetramethyl diamidophosphono acrylate was isolated by distillation under reduced pressure, B. P. 104° to 107° C./0.5 mm. pressure.

In place of the ethyl-N,N,N',N'-tetramethyl diamidophosphite in the above example, there can be substituted ethyl-N,N,N',N'-tetraethyl diamidophosphite or butyl N,N,N',N'-tetraethyl diamidophosphite to give methyl-α-N,N,N',N'-tetraethyl diamidophosphono acrylate, or ethyl-N,N'-diethyl-N,N'-dimethyl diamidophosphite to give methyl-α-N,N'-diethyl-N,N'-dimethyl diamidophosphone acrylate, etc. In place of the methyl-β-acetoxy-α-bromo propionate in the above example, there can be substituted ethyl-β-acetoxy-α-bromo propionate to give ethyl-α-N,N,N',N'-tetramethyl diamidophosphono acrylate, etc.

*Example 6*

8 g. of styrene, 2 g. of methyl-α-N,N,N',N'-tetramethyl diamidophosphono acrylate prepared as described in Example 5, and 0.1 g. of acetyl peroxide were placed in a glass bottle. The air in the bottle was displaced by nitrogen gas and the reaction mixture was then heated at 60° C. until the mixture had set to a clear, hard polymer. The polymer was flame resistant and was useful for shaping into molded objects. It was soluble in aromatic or chlorinated aromatic solvents such as benzene, chlorobenzene, etc.

*Example 7*

6 g. of styrene, 4 g. of methyl-β-N,N,N',N'-tetramethyl diamidophosphono acrylate prepared as described in Example 1, and 0.1 g. of acetyl peroxide were placed in a sealed glass bottle. After the air in the bottle has been displaced with nitrogen gas, the reaction mixture was heated at 60° C. on a constant temperature bath until it had set to a clear, hard mass. The polymer consisted of approximately 60% by weight of styrene and 40% by weight of the diamidophosphono acrylate compound. It was flame resistant and useful for shaping into molded objects. When a molecular equivalent of methyl α-methacrylate replaced the styrene in the above example, a polymer exhibiting similar flame resisting properties was obtained. The styrene copolymer was soluble in aromatic or chlorinated aromatic solvents. The methyl methacrylate copolymer was soluble in acetone, acetonitrile and dimethylformamide.

*Example 8*

8 g. of freshly distilled acrylonitrile, 2 g. of methyl-β-N,N-diethyl-N',N'-dimethyl diamidophosphono acrylate prepared as described in Example 2, 1 cc. of a 10% aqueous solution of hydrogen peroxide, and 1 cc. of 6-Normal sulfuric acid were added to 90 cc. of distilled water containing 0.02 g. of ferrous sulfate dissolved therein. The polymerization started almost immediately as evidenced by the formation of a fine powdery precipitate and was completed at the end of 4–5 hours. The reaction mixture was filtered and the filtered cake was washed free of acid and iron with distilled water and then dried. The resulting polymer consisted of approximately 80% by weight of acrylonitrile and 20% by weight of the diamidophosphono acrylate. It was white in color and was found to be useful in the preparation of white lustrous fibers when dissolved in a suitable solvent, e. g. N,N-dimethyl formamide, N,N-dimethyl acetamide, gamma-butyrolactone, etc., to give a 10–20% by weight of the polymer. The solution was spun into a coagulating bath and the fibers then drafted from 200–500% in hot air or oil. The polymer was flame resistant and had a softening point of 200–210° C.

In place of the methyl-β-N,N-diethyl-N',N'-dimethyl diamidophosphono acrylate in the above example, there can be substituted an equivalent amount of methyl-β-N,N,N',N'-tetraethyl diamidophosphono acrylate, prepared according to the process of Example 3, to give similarly useful polymers for the preparation of flame resistant fibers.

*Example 9*

5 g. of ethyl-N,N'-dimethyl diamidophosphono acrylate, 2 g. of soap, 0.1 g. of ammonium persulfate and 0.2 g. of ammonium bisulfite were placed in 100 cc. of water in a pressure bottle. The bottle was closed and vinyl chloride was passed in until a total of 10 g. had been added. After heating the bottle for 24 hours at 60° C., acetic acid was added and the white product which separated was filtered off, washed free of acid with distilled water, and then dried. The polymer so obtained was found to be useful in the manufacture of molded objects. It was flame resistant and soluble in acetone, acetonitrile and dimethylformamide.

In place of vinyl chloride in the above example, there can be substituted an equivalent amount of vinylidene chloride to give a copolymer having generally similar properties.

*Example 10*

1 g. of vinylidene chloride, 5 g. of methyl-α-N,N,N',N'-tetramethyl diamidophosphono acrylate prepared as described in Example 5, 0.5 g. of a 10% solution of hydrogen peroxide, 0.1 g. of diisopropyl dixanthogen and 0.02 g. of ferrous sulfate were dispersed in 40 g. of a 1.5% aqueous solution of sodium oleate in a pressure bottle. 10 g. of 1,3-butadiene were passed in and the bottle was closed. After standing at room temperature for 24 hours, the polymerization was obtained in the form of a latex-like dispersion which resembled natural latex-rubber, and contained approximately 62% by weight of butadiene. Generally similar products are obtained by varying the ratio of vinyl chloride to butadiene in the above example between the ratios of from 1:1 to from 1:10 by weight. It was coatable in this form to give elastic sheets and films.

By proceeding as set forth in the examples, other polymers of generally similar properties can be prepared, for example, all of the diamidophosphono acrylates of the invention are homopolymerizable in mass or in solution in the presence of heat and a polymerization catalyst to give polymethyl-β-N,N,N',N'-tetramethyl diamidophosphono acrylate, polymethyl-β-N,N-diethyl-N',N'-dimethyl diamidophosphono acrylate, polymethyl-β-N,N,N',N'-tetraethyl diamidophosphono acrylate, polyethyl-β-N,N'-dimethyl diamidophosphono acrylate, polymethyl-α-N,N,N',N'-tetramethyl diamidophosphono acrylate, and the like. Copolymers of any of the mentioned other monoethylenically unsaturated, polymerizable monomeric compounds with any of the diamidophosphono acrylates mentioned, other monoethylenically unsaturated, polymerizable monomeric compounds with any of the diamidophosphono acrylates mentioned, in the stated range of proportions can also be prepared. All the polymers of the invention are soluble in one or more solvents such as acetone, acetonitrile, dimethylformamide, benzene or chlorobenzene.

Those of our copolymers which contain from 60% to 95% by weight of acrylonitrile are particularly useful for the preparation of fibers and filaments. They are compatible with each other and with polyacrylonitrile and with other acrylonitrile polymers in practically all proportions. Other copolymers of our invention are more adapted to preparing molding compositions or solutions which can be coated to form films and sheets suitable for photographic film supports, etc. Plasticizers, fillers, dyes, etc. can be incorporated into all of the above kind of compositions.

What we claim as our invention and desire secured by Letters Patent of the United States is:

1. A diamidophosphono acrylate selected from those represented by the general structural formulas:

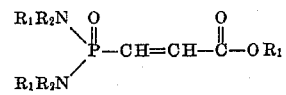

and

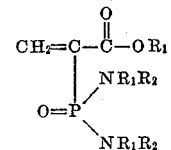

wherein $R_1$ represents an alkyl group containing from 1 to 4 carbon atoms and $R_2$ represents a member selected from the group consisting of an atom of hydrogen and an alkyl group containing from 1 to 4 carbon atoms.

2. Methyl-β-N,N,N',N'-tetramethyl diamidophosphono acrylate.

3. Methyl-β-N,N-diethyl-N',N'-dimethyl diamidophosphono acrylate.

4. Methyl-β-N,N,N',N'-tetraethyl diamidophosphono acrylate.

5. Ethyl-β-N,N'-dimethyl diamidophosphono acrylate.

6. Methyl-α-N,N,N',N'-tetramethyl diamidophosphono acrylate.

References Cited in the file of this patent

UNITED STATES PATENTS

| | | |
|---|---|---|
| 2,439,214 | Lindsey | Apr. 6, 1948 |
| 2,441,130 | Bernstein et al. | May 11, 1948 |
| 2,559,854 | Dickey et al. | July 10, 1951 |
| 2,632,768 | Coover et al. | Mar. 24, 1953 |
| 2,668,838 | Tolkmith | Feb. 9, 1954 |